United States Patent
Zhang et al.

(10) Patent No.: US 8,819,685 B2
(45) Date of Patent: Aug. 26, 2014

(54) METHOD AND APPARATUS FOR ADJUSTING I/O CHANNEL ON VIRTUAL PLATFORM

(71) Applicant: Huawei Technologies Co., Ltd., Shenzhen (CN)

(72) Inventors: Jie Zhang, Hangzhou (CN); Xin Jin, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/108,804

(22) Filed: Dec. 17, 2013

(65) Prior Publication Data

US 2014/0208318 A1 Jul. 24, 2014

Related U.S. Application Data

(63) Continuation of application No. PCT/CN2013/080837, filed on Aug. 5, 2013.

(30) Foreign Application Priority Data

Jan. 24, 2013 (CN) .......................... 2013 1 0027312

(51) Int. Cl.
 *G06F 9/46* (2006.01)
 *G06F 3/00* (2006.01)
 *G06F 9/50* (2006.01)
 *G06F 9/455* (2006.01)
 *G06F 3/06* (2006.01)

(52) U.S. Cl.
 CPC .......... *G06F 9/45533* (2013.01); *G06F 9/5066* (2013.01); *G06F 9/45529* (2013.01); *G06F 3/0613* (2013.01)
 USPC ................................ 718/101; 718/104; 710/5

(58) Field of Classification Search
 CPC .. G06F 9/45529; G06F 9/5066; G06F 3/0613
 USPC ........................................... 718/1, 104; 710/5
 See application file for complete search history.

(56) References Cited

U.S. PATENT DOCUMENTS

| 2002/0049869 | A1 | 4/2002 | Ohmura et al. |
| 2014/0032837 | A1* | 1/2014 | Nagasaki et al. ............. 711/114 |

FOREIGN PATENT DOCUMENTS

| CN | 102317917 A | 1/2012 |
| CN | 102508718 A | 6/2012 |
| CN | 103116517 A | 5/2013 |

OTHER PUBLICATIONS

Foreign Communication From A Counterpart Application, PCT Application No. PCT/CN2013/080837, Chinese Search Report dated Nov. 14, 2013, 6 pages.
Foreign Communication From A Counterpart Application, PCT Application No. PCT/CN2013/080837, Chinese Written Opinion dated Nov. 14, 2013, 5 pages.

* cited by examiner

*Primary Examiner* — Camquy Truong
(74) *Attorney, Agent, or Firm* — Conley Rose, P.C.; Grant Rodolph

(57) ABSTRACT

A method and an apparatus for adjusting an input/output (I/O) channel on a virtual platform, and the method for adjusting an I/O channel includes: counting, by a host, current average I/O throughput of multiple virtual machines (VMs) operating on the host; increasing or decreasing, by the host, working threads for processing the VMs between front devices and back devices of the multiple VMs according to the current average I/O throughput; and adjusting, by the host, a mapping relationship between queues in the front device, queues in the back devices of the multiple VMs, and working threads for processing the VMs. According to the present invention, when the I/O throughput decreases, idle I/O channel resources are released, thereby avoiding a waste of the I/O channel resources; when the I/O throughput increases, the I/O channel resources are increased, resulting in an improved data transmission capability of the I/O channels.

13 Claims, 5 Drawing Sheets

METHOD AND APPARATUS FOR ADJUSTING I/O CHANNEL ON VIRTUAL PLATFORM

CROSS-REFERENCE TO RELATED APPLICATIONS

This application is a continuation of International Application No. PCT/CN2013/080837, filed on Aug. 5, 2013, which claims priority to Chinese Patent Application No. 201310027312.7, filed on Jan. 24, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the field of virtual technologies, and in particular, to a method and apparatus for adjusting an input/output (I/O) channel on a virtual platform.

BACKGROUND OF THE INVENTION

Virtualization abstracts and converts computer physical resources, such as a server, a network, a memory, and storage and presents them, so that a user may use these resources in a better manner than an original configuration. The new virtual part of these resources is not limited by architecture manners, localities or physical configurations of the original resources. Multiple virtual machines (VMs) operate on a host that physically exists. The host manages all physical hardware devices and resources, and virtualizes an exclusive device into multiple virtual devices for simultaneous use by multiple user threads. A device that each user is capable of seeing is a virtual device, and the physical hardware devices are transparent to the user.

In a virtual environment, a VM is not able to directly access a hardware device, and a host provides for the VM a data channel to connect to the hardware device, namely, an I/O channel. In the present invention, the channel includes a data channel between a VM front device and a VM back device, and a data channel between a VM back device and a host native device; where the VM front device is a device seen in the virtual machine, and is actually a device simulated by the host for the VM, the VM back device is a software simulation device connected to the VM front device in a host operating system, and the host native device is a host physical device.

FIG. 1 describes a simple multi-I/O channel technology on a virtual platform in the prior art, and two VMs, VM1 and VM2 are used as an example, where there are multiple I/O channels (two I/O channels are used as an example in FIG. 1) between a front device and a back device of a VM. A data processing module is a bridge between the front device and the back device of the VM, is used for data copying, data filtering or other data processing services, and includes multiple working threads (two working threads are used as an example in FIG. 1); the number of working threads is equal to the number of I/O channels between the VM front device and the VM back device, and each I/O channel corresponds to one working thread. A single channel exists between the VM back device and bridge, and between the bridge and the native device, and the VM back device transmits data to the native device through the single channel.

The foregoing prior art has at least the following technical problems: the number of I/O channels between a VM front device and a VM back device is determined when a VM is created, the number of I/O channels cannot be changed in a VM life cycle, and therefore, channel resources occupied by the I/O channels between the VM front device and the VM back device cannot be changed. When I/O throughput between the VM front device and the VM back device changes, I/O channel resources cannot be adjusted; when the I/O throughput decreases, idle I/O channel resources cannot be released, resulting in a waste of the I/O channel resources; when the I/O throughput increases, I/O channel resources cannot be increased, resulting in an inability to improve a data transmission capability of the I/O channels and degraded system performance.

SUMMARY OF THE INVENTION

Embodiments of the present invention provide a method for adjusting an I/O channel on a virtual platform, and a host adjusting apparatus, so as to dynamically adjust distribution of I/O channel resources between front devices and back devices of multiple VMs, thereby improving system performance.

According to a first aspect, the present invention provides a method for adjusting an I/O channel on a virtual platform, and the method includes: counting, by a host, current average I/O throughput of multiple VMs operating on the host; increasing, by the host, working threads for processing VMs between front devices and back devices of the multiple VMs when the current average I/O throughput is greater than a first threshold value, so that the average I/O throughput of the multiple VMs is less than the first threshold value after the working thread is increased; or decreasing, by the host, working threads for processing VMs between front devices and back devices of the multiple VMs when the current average I/O throughput is less than a second threshold value, so that the average I/O throughput of the multiple VMs is greater than the second threshold value after the working threads are decreased, where the first threshold value is greater than the second threshold value; and separately adjusting, by the host according to working threads for processing VMs after the increase or decrease, a mapping relationship between queues in the front devices of the multiple VMs and working threads for processing VMs, and a mapping relationship between queues in the back devices of the multiple VMs and working threads for processing VMs, so that multiple data transmission channels are formed between the front devices and the back devices of the multiple VMs.

In a first possible implementation manner, with reference to the first aspect, if the current average I/O throughput is greater than the first threshold value, before the increasing, by the host, working threads for processing VMs between front devices and back devices of the multiple VMs, the method further includes: comparing, by the host, an increase in CPU utilization and an increase in I/O throughput resulting from increasing working threads for processing VMs between the front devices and the back devices of the multiple VMs; and if the increase in the I/O throughput is greater than the increase in CPU utilization, executing the step of increasing, by the host, working threads for processing VMs between front devices and back devices of the multiple VMs.

In a second possible implementation manner, with reference to the first aspect, if the current average I/O throughput is less than the second threshold value, before the decreasing, by the host, working threads between front devices and back devices of the multiple VMs, the method further includes: determining, by the host, whether a decrease in CPU utilization resulting from decreasing working threads between the front devices and the back devices of the multiple VMs leads to an inability to respond to the throughput of the multiple VMs, if the decrease in CPU utilization resulting from decreasing working threads between the front devices and the back devices of the multiple VMs does not lead to an inability to respond to the throughput of the multiple VMs, executing the step of decreasing, by the host, working threads between front devices and back devices of the multiple VMs.

In a third possible implementation manner, with reference to the first aspect, or the first or second possible implementation manner of the first aspect, the separately adjusting, by the host according to working threads for processing VMs after the increase or decrease, a mapping relationship between queues in the front devices of the multiple VMs and working threads for processing VMs, and a mapping relationship between queues in the back devices of the multiple VMs and working threads for processing VMs includes: when the number of working threads for processing VMs after the increase or decrease is less than the number of VMs operating on the host, mapping, by the host, each working thread to a queue in a front device of each VM and a queue in a back device of each VM; or when the number of working threads for processing VMs after the increase or decrease is greater than or equal to the number of VMs operating on the host, mapping, by the host, an exclusive working thread to a queue in a front device and a queue in a back device of a VM, mapping a shared working thread to queues, which are in front devices and back devices of at least two VMs and do not correspond to the exclusive working thread, where the working threads for processing VMs include the exclusive working thread and the shared working thread.

In a fourth possible implementation manner, with reference to the first aspect, or the first, second, or third possible implementation manner of the first aspect, after the separately adjusting, by the host according to working threads for processing VMs after the increase or decrease, a mapping relationship between queues in the front devices of the multiple VMs and working threads for processing VMs, and a mapping relationship between queues in the back devices of the multiple VMs and working threads for processing VMs, the method further includes: adjusting, by the host, a mapping relationship between queues in the back devices of the multiple VMs and queues in a native device of the host, so that multiple data transmission channels are formed between the back devices of the multiple VMs and the Native Device.

According to a second aspect, the present invention provides an apparatus host for adjusting an I/O channel on a virtual platform, and the host includes: a counting module configured to count current average I/O throughput of multiple VMs operating on the host; a processing module, which is connected to the counting module configured to increase working threads for processing VMs between front devices and back devices of the multiple VMs when the current average I/O throughput counted by the counting module is greater than a first threshold value, so that the average I/O throughput of the multiple VMs is less than the first threshold value after the working threads are increased; or decrease working threads for processing VMs between front devices and back devices of the multiple VMs when the current average I/O throughput counted by the counting module is less than a second threshold value, so that the average I/O throughput of the multiple VMs is greater than the second threshold value after the working threads are decreased, where the first threshold value is greater than the second threshold value; and a first adjusting module, which is connected to the processing module configured to separately adjust, according to working threads for processing VMs after an increase or a decrease by the processing module, a mapping relationship between queues in the front devices of the multiple VMs and working threads for processing VMs, and a mapping relationship between queues in the back devices of the multiple VMs and working threads for processing VMs, so that multiple data transmission channels are formed between the front devices and the back devices of the multiple VMs.

In a first possible implementation manner, with reference to the second aspect, the adjusting apparatus further includes: a determining module configured to compare an increase in CPU utilization and an increase in I/O throughput resulting from increasing working threads for processing VMs between the front devices and the back devices of the multiple VMs when the current average I/O throughput counted by the counting module is greater than the first threshold value; the processing module is further configured to increase working threads for processing VMs between the front devices and the back devices of the multiple VMs if the increase in I/O throughput is greater than the increase in CPU utilization, so that the average I/O throughput of the multiple VMs is less than the first threshold value after the working threads are increased.

In a second possible implementation manner, with reference to the second aspect, the adjusting apparatus further includes: a determining module configured to determine whether a decrease in CPU utilization resulting from decreasing working threads between the front devices and the back devices of the multiple VMs leads to an inability to respond to the throughput of the multiple VMs when the current average I/O throughput counted by the counting module is less than a second threshold value; the processing module is further configured to decrease working threads between the front devices and the back devices of the multiple VMs if the decrease in CPU utilization resulting from decreasing working threads between the front devices and the back devices of the multiple VMs does not lead to an inability to respond to the throughput of the multiple VMs, so that the average I/O throughput of the multiple VMs is greater than the second threshold value after the working threads are decreased.

In a third possible implementation manner, with reference to the second aspect, or the first, or the second possible implementation manner of the first aspect, the first adjusting module is specifically configured to: map each working thread to a queue in a front device of each VM and a queue in a back device of each VM when the number of working threads for processing VMs after the increase or decrease is less than the number of VMs operating on the host, or map an exclusive working thread to a queue in a front device and a queue in a back device of a VM, and map a shared working thread to queues, which are in front devices and back devices of at least two VMs and do not correspond to the exclusive working thread when the number of working threads for processing VMs after the increase or decrease is greater than or equal to the number of VMs operating on the host, where the working threads for processing VMs include the exclusive working thread and the shared working thread.

In a fourth possible implementation manner, with reference to the first aspect, or the first, the second, or the third possible implementation manner of the first aspect, the adjusting device further includes: a second adjusting module configured to adjust a mapping relationship between queues in the back devices of the multiple VMs and queues in a native device of the host, so that multiple data transmission channels are formed between the back devices of the multiple VMs and the Native Device.

According to a third aspect, the present invention provides a host, and the host includes: a native device, and front devices and back devices of multiple VMs operating on the Native Device, and a data processing module between the front devices and the back devices of the multiple VMs, where the data processing module is configured to: count current average I/O throughput of multiple VMs; increase working threads for processing VMs between the front devices and the back devices of the multiple VMs when the current average I/O throughput is greater than a first threshold value, so that the average I/O throughput of the multiple VMs is less than the first threshold value after the working threads are increased; or decrease working threads for processing VMs between the front devices and the back devices of the multiple VMs when the current average I/O throughput is less than a second threshold value, so that the average I/O throughput of the multiple VMs is greater than the second threshold value after the working threads are decreased, where the first threshold value is greater than the second threshold value; and separately adjust a mapping relationship between queues in the front devices of the multiple VMs and working threads for processing VMs, and a mapping relationship between queues in the back devices of the multiple VMs and working threads for processing VMs, so that multiple data transmission channels are formed between the front devices and the back devices of the multiple VMs.

In a first possible implementation manner, with reference to the third aspect, the data processing module is further configured to: compare an increase in CPU utilization and an increase in I/O throughput resulting from increasing working threads for processing VMs between the front devices and the back devices of the multiple VMs; and if the increase in the I/O throughput is greater than the increase in CPU utilization, increase working threads for processing VMs between the front devices and the back devices of the multiple VMs, so that the average I/O throughput of the multiple VMs is less than the first threshold value after the working threads are increased.

In a second possible implementation manner, with reference to the third aspect, the data processing module is further configured to: determine whether a decrease in CPU utilization resulting from decreasing working threads between the front devices and the back devices of the multiple VMs leads to an inability to respond to the throughput of the multiple VMs, and decrease working threads between the front devices and the back devices of the multiple VMs if the decrease in CPU utilization resulting from decreasing working threads between the front devices and the back devices of the multiple VMs does not lead to an inability to respond to the throughput of the multiple VMs, so that the average I/O throughput of the multiple VMs is greater than the second threshold value after the working threads are decreased.

It may be seen that, in the embodiment of the present invention, whether to increase or decrease working threads for processing VMs between front devices and back devices of multiple VMs is determined according to current average I/O throughput of the multiple VMs. When the current average I/O throughput of the multiple VMs is greater than a first threshold value, working threads for processing VMs are increased, that is, I/O channel resources are increased, to improve a data transmission capability of an I/O channel; and when the current average I/O throughput of the multiple VMs is less than a second threshold value, working threads for processing VMs are decreased, that is, I/O channel resources are decreased, to avoid waste of the I/O channel resources.

Furthermore, a host forms multiple data transmission channels between the back devices of the multiple VMs and a native device by adjusting a mapping relationship between queues in the back devices of the multiple VMs and queues in the native device of the host. This achieves multiple I/O channels between the front devices of the multiple VMs and the native device of the host, and improves a data transmission capability between the front devices of the multiple VMs and the native device of the host.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

Figure 1:
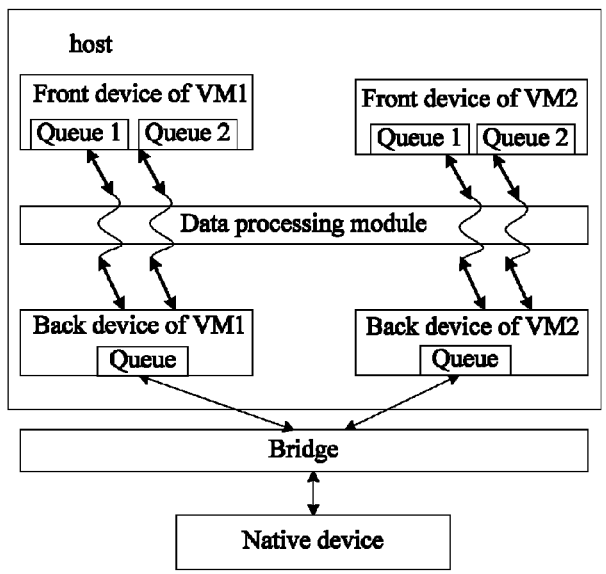
FIG. 1 is an architectural diagram of a simple multi-I/O channel technology on a virtual platform in the prior art.

To make the objectives, technical solutions, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Some elements introduced in the description of the embodiments of the present invention are introduced herein first for ease of understanding of the embodiments of the present invention.

Host: functions as a management layer and is used to manage and allocate hardware resources; presents a virtual hardware platform for a virtual machine, where the virtual hardware platform provides various hardware resources for all virtual machines operating on the virtual hardware platform, for example, providing a virtual processor (for example, virtual central processing unit (VCPU), a virtual memory, a virtual magnetic disk, a virtual network adapter, and the like. The virtual magnetic disk may correspond to a file or a logical block device of the host. A virtual machine operates on the virtual hardware platform prepared by the host, on which one or more virtual machines operate.

VM: simulates one or more virtual computers on a physical computer by using virtual machine software, these virtual machines operate like a real computer, an operating system and an application program may be installed on the virtual machine, and the virtual machine may also access a network resource. For an application program operating on the virtual machine, the virtual machine operates like a real computer.

Data processing module: in the present invention, a data processing module is introduced between a front device and a back device of a VM, and is configured to process data transmission between the front device and the back device of the VM, and process data in a queue in the front device and the back device of the VM by using a working thread. The data processing module is usually implemented by using software, that is, a processor reads a software code instruction with a special function to implement the data processing module.

Native device: a hardware platform on which a virtual environment operates. The Native Device may include multiple types of hardware, for example, a Native Device of a certain computing node may include a processor (for example, CPU), a memory, and may further include high-speed/low-speed I/O devices, such as a network adapter and a memory.

Bridge: a network device or software between a back device of a VM and a native device of a host to implement network connection between the back device of the VM and the native device of the host, and forward a data frame.

Figure 2:
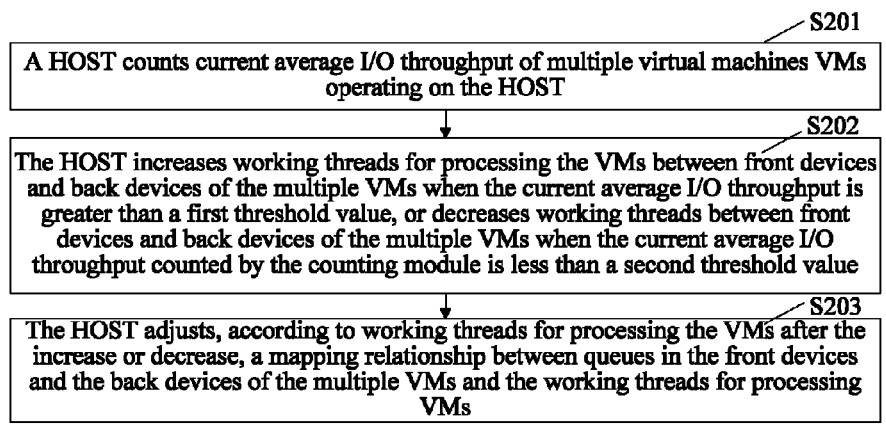
FIG. 2 is a flow chart of a method for adjusting an I/O channel on a virtual platform according to an embodiment of the present invention.

FIG. 2 describes a process of a method for adjusting an I/O channel on a virtual platform according to an embodiment of the present invention, where the process specifically includes the following steps:

S201. A host counts current average I/O throughput of multiple VMs operating on the host.

Specifically, the host obtains the current average I/O throughput of the multiple VMs by first counting a current total I/O throughput of the multiple VMs operating on the host, and dividing the total I/O throughput by the number of VMs operating on the host.

S202. The host increases working threads for processing VMs between front devices and back devices of the multiple VMs when the current average I/O throughput is greater than a first threshold value, or decreases working threads between front devices and back devices of the multiple VMs when the current average I/O throughput is less than a second threshold value.

Working threads for processing VMs are increased between the front devices and the back devices of the multiple VMs, so that the average I/O throughput of the multiple VMs is greater than the first threshold value after the working threads are increased; or working threads for processing VMs are decreased between the front devices and the back devices of the multiple VMs, so that the average I/O throughput of the multiple VMs is greater than the second threshold value after the working thread is decreased. The first threshold value is greater than the second threshold value, the first threshold value is used to indicate an upper threshold value of the average I/O throughput of the multiple VMs, and the second threshold value is used to indicate a lower threshold value of the average I/O throughput of the multiple VMs, that is, the first threshold value indicates an upper threshold value of I/O throughput borne by a VM, and the second threshold value indicates a lower threshold value of I/O throughput borne by a VM.

Furthermore, if the current average I/O throughput of the multiple VMs is greater than the first threshold value, before the step of increasing, by the host, working threads for processing VMs between front devices and back devices of the multiple VMs, the method further includes:

The host compares an increase in CPU utilization and an increase in I/O throughput resulting from increasing working threads for processing VMs between the front devices and the back devices of the multiple VMs; and if the increase in the I/O throughput is greater than the increase in CPU utilization, executes the step of increasing, by the host, working threads for processing VMs between front devices and back devices of the multiple VMs.

The increase in CPU utilization is increased CPU utilization resulting from increasing the working threads for processing VMs compared with not increasing the working threads for processing VMs, and may be expressed by an increased amount of CPU utilization and/or an increase rate of CPU utilization; the increase in I/O throughput is increased I/O throughput resulting from increasing the working threads for processing VMs compared with not increasing the working threads for processing VMs, and may be expressed by an increased amount of I/O throughput and/or an increased rate of I/O throughput. It should be noted that the present invention does not limit how to compare an increase in CPU utilization and an increase in I/O throughput; two measurement methods are provided herein only for exemplary purpose. If an increased amount of I/O throughput is greater than an increased amount of CPU utilization, or an increased rate of I/O throughput is greater than an increased rate of CPU utilization, it is determined that a working thread for processing VMs needs to be increased.

Furthermore, if the current average I/O throughput is less than the second threshold value, before the step of decreasing, by the host, working threads for processing VMs between front devices and back devices of the multiple VMs, the method further includes:

The host determines whether a decrease in CPU utilization resulting from decreasing working threads between the front devices and the back devices of the multiple VMs leads to an inability to respond to the throughput of the multiple VMs; if the decrease in CPU utilization resulting from decreasing working threads between the front devices and the back devices of the multiple VMs does not lead to an inability to respond to the throughput of the multiple VMs, executes the step of decreasing, by the host, working threads between front devices and back devices of the multiple VMs, that is, if the resulted decrease in CPU utilization leads to an inability to respond to the throughput of the multiple VMs, the working threads are not decreased.

Optionally, priorities may be set for the multiple VMs, so that a VM with a high priority maintains exclusive occupation of a working thread, and has a dedicated I/O channel, and an I/O channel resource exclusively occupied by the VM with a high priority is not affected regardless of the overall I/O load of the host; and for VMs with the same priority, the foregoing method for increasing or decreasing working threads may be adopted for processing.

It should be noted that the I/O channel resource includes a working thread for processing a VM, and a queue in a front device and a back device of a VM.

S203. According to working threads for processing VMs after the increase or decrease, the host separately adjusts a mapping relationship between queues in the front devices and the back devices of the multiple VMs and working threads for processing VMs.

The mapping relationship includes: a mapping relationship between queues in the front devices of the multiple VMs and working threads for processing VMs, and a mapping relationship between queues in the back devices of the multiple VMs and working threads for processing VMs. The host separately adjusts the mapping relationship, so that multiple data transmission channels are formed between the front devices of multiple VMs and the back devices of the multiple VMs.

Specifically, that the host separately adjusts, according to working threads for processing VMs after the increase or decrease, a mapping relationship between queues in the front devices of the multiple VMs and working threads for processing VMs, and a mapping relationship between queues in the back devices of the multiple VMs and working threads for processing VMs includes:

When the number of working threads for processing VMs after the increase or decrease is less than the number of VMs operating on the host, the host maps each working thread to a queue in a front device of each VM and a queue in a back device of each VM, or when the number of working threads for processing VMs after the increase or decrease is greater than or equal to the number of VMs operating on the host, the host maps an exclusive working thread to a queue in a front device and a queue in a back device of a VM, maps a shared working thread to queues, which are in front devices and back devices of at least two VMs and do not correspond to the exclusive working thread, where the working threads for processing VMs include the exclusive working thread and the shared working thread. It should be noted that the foregoing adjusting modes, respectively, correspond to a shared mode and a hybrid mode, and the shared and the hybrid modes are described specifically in FIG. 3 and FIG. 4.

Furthermore, after the host separately adjusts, according to working threads for processing VMs after the increase or decrease, a mapping relationship between queues in the front devices and the back devices of the multiple VMs and the working threads for processing VMs, the method for adjusting an I/O channel on a virtual platform further includes:

the host adjusts a mapping relationship between queues in the back devices of the multiple VMs and queues in a native device of the host, so that multiple data transmission channels are formed between the back devices of the multiple VMs and the Native Device.

Specifically, in the prior art, a Native Device may have multiple queues, data in a back device of a VM selects a queue when accessing the Native Device, so as to transmit data by using different queues. This technology may be implemented by a hardware driver in the Native Device. Given that a back device of a VM in the present invention also has multiple queues, the multiple queues in the back device of the VM may also be selected when the Native Device sends data to the back device of the VM through a bridge, so that multiple data transmission channels are formed between the back device of the VM and the Native Device. Therefore, adjusting a mapping relationship between queues in the back devices of the multiple VMs and queues in a native device of the host is actually how to select queues in the back device of the VM when the Native Device sends data to the back device of the VM through the bridge.

For how to select queues in a back device of a VM may be, according to a mapping relationship between queues when the queues in the Native Device receive data sent by the queues in the back device of the VM, the queues in the back device of the VM are reversely selected, so that channels for transmitting data between the queues in the back device of the VM and the queues in the Native Device are consistent; or the Native Device reselects different queues in the back device of the VM according to an attribute (for example, from the same source end, or another attribute) of a data flow. The present invention implements the adjustment of a mapping relationship between queues in the back devices of the multiple VMs and queues in a native device of the host by using the foregoing selection methods.

Because multiple data transmission channels are formed between back devices of multiple VMs and a native device by adjusting a mapping relationship between queues in the back devices of the multiple VMs and queues in a native device of the host, multiple I/O channels are implemented between the back devices of the multiple VMs and the native device of the host, improving a data transmission capability between the multiple VMs and the native device of the host.

It may be known from the foregoing embodiment that a host determines whether to increase or decrease working threads for processing VMs between front devices and back devices of multiple VMs according to current average I/O throughput of the multiple VMs; when the current average I/O throughput of the multiple VMs is greater than a first threshold value, increases working threads for processing VMs, that is, increases I/O channel resources, to improve a data transmission capability of an I/O channel; and when current average I/O throughput of multiple VMs is less than a second threshold value, decreases working threads for processing VMs, that is, decreases I/O channel resources, to avoid a waste of the I/O channel resources.

Considering that the limitation of I/O channel resources after an increase or a decrease according to current average I/O throughput, especially the limitation of working threads in the I/O channel resources, the present invention sets two I/O working modes, namely, a shared mode and a hybrid mode according to the number of working threads in the I/O channel resources and the number of VMs operating on a host, where the two modes may be switched to each other, one working mode may be switched to the other working mode when a certain condition is met.

For the shared mode, when the number of working threads for processing VMs is less than the number of VMs operating on a host, the host adjusts an I/O working mode between front devices and back devices of multiple VMs to the shared mode, that is, working threads in a data processing module process data in queues in the front devices and the back devices of the multiple VMs by adopting the shared mode, specifically, working threads in the data processing module, respectively, correspond to a queue in a front device of each VM operating on the host and a queue in a back device of each VM.

Figure 3:
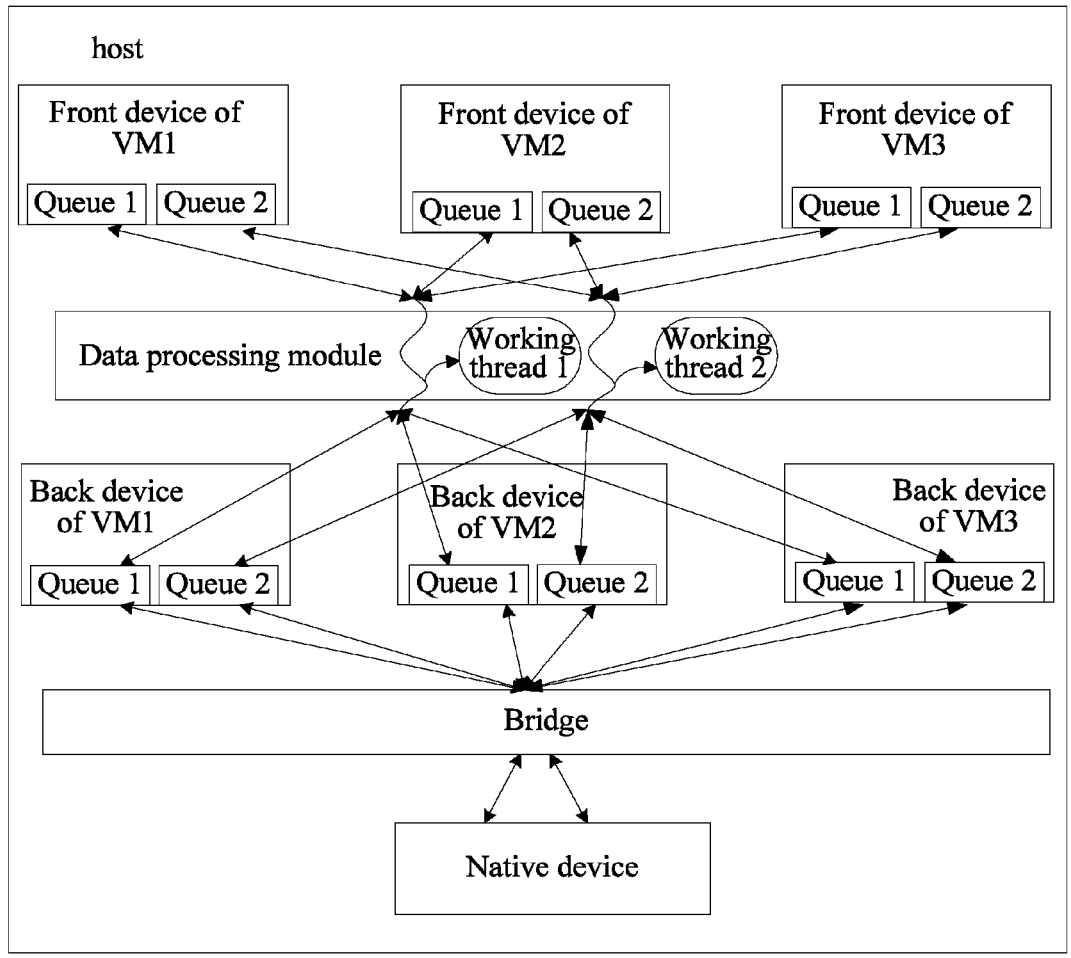
FIG. 3 is an architectural diagram when a working mode of I/O between front devices and back devices of multiple VMs on a virtual platform is a shared mode according to the present invention.

FIG. 3 is a schematic diagram when an I/O working mode between a front device and a back device of a VM is a shared mode, as shown in FIG. 3, and VMs operating on a host are, respectively, VM1, VM2 and VM3, working threads in a data processing module are, respectively, a working thread 1 and a working thread 2, where the working thread 1 separately processes a queue 1 in a front device and a back device of VM1, VM2 and VM3, and the working thread 2 separately processes a queue 2 in the front device and the back device of VM1, VM2 and VM3.

For the hybrid mode, when the number of working threads for processing VMs is greater than or equal to the number of VMs operating on a host, the host adjusts an I/O working mode between front devices and back devices of multiple VMs to the hybrid mode, that is, working threads in a data processing module process data in queues of the front devices and back devices of the multiple VMs by adopting the hybrid mode, specifically, working threads in the data processing module may be categorized into two types: an exclusive working thread and a shared working thread, where the exclusive working thread is used to process separately data in a queue in a front device and a queue in a back device of a VM, and the shared working thread is used to process data that is not processed by the exclusive working thread in queues of front devices and back devices of at least two VMs.

Figure 4:
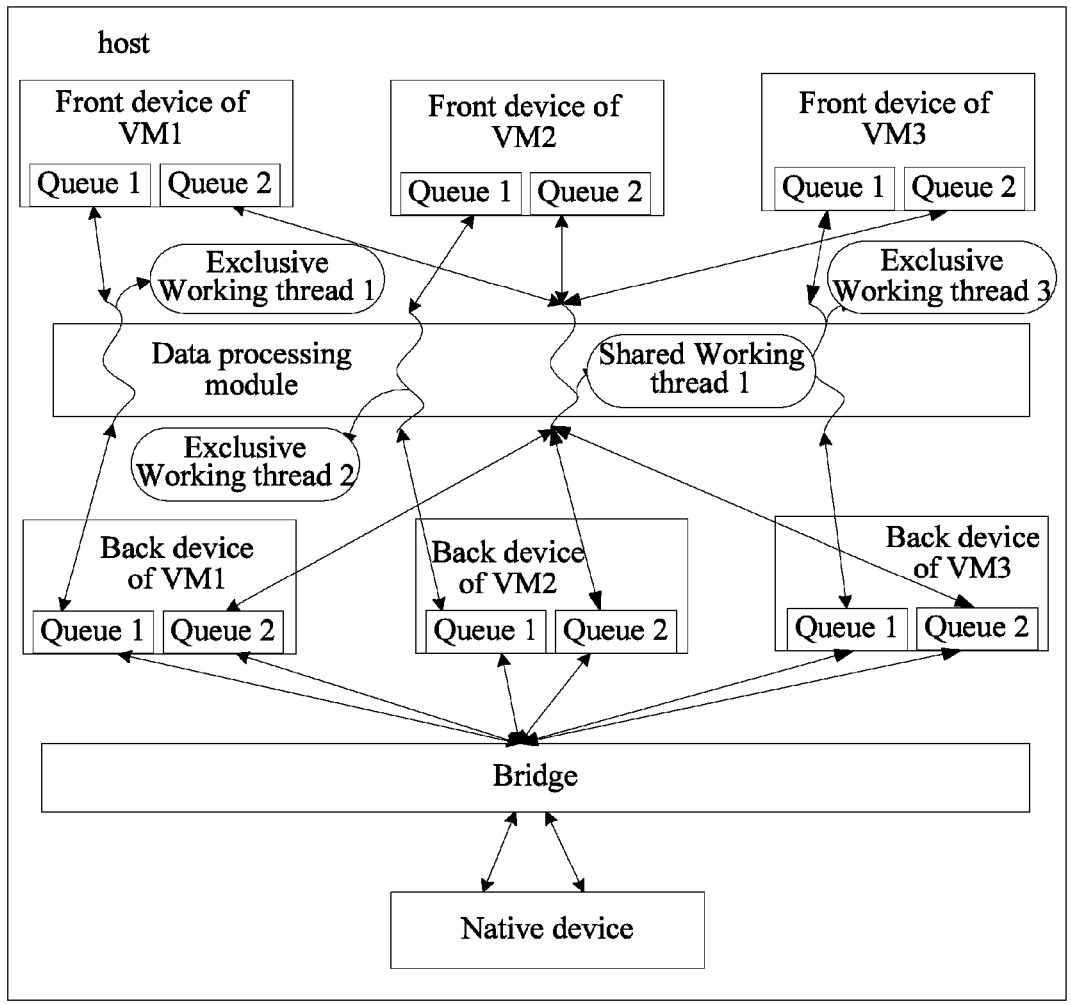
FIG. 4 is an architectural diagram when a working mode of I/O between front devices and back devices of multiple VMs on a virtual platform is a hybrid mode according to the present invention.

FIG. 4 is a schematic diagram when an I/O working mode between a front device and a back device of a VM is a hybrid mode, and as shown in FIG. 4, VMs operating on a host are, respectively, VM1, VM2 and VM3, and there are four working threads in a data processing module, including an exclusive working thread 1, an exclusive working thread 2, an exclusive working thread 3, and a shared working thread 1. The exclusive working thread 1 separately processes data in a queue 1 in a front device and a back device of VM1, the exclusive working thread 2 separately processes data in a queue 1 of a front device and a back device of VM2, the exclusive Working thread 3 separately processes data in a queue 1 of a front device and a back device of VM3, and the shared working thread processes data in a queue 2 of a front device and a back device of each VM of VM1, VM2 and VM3. FIG. 4 only shows a scenario in which the shared working thread processes data in a queue in a front device and a back device of each VM of at least two VMs. The shared working thread may further process data in multiple queues in another scenario, which is not limited by the present invention.

Furthermore, it is known from FIG. 3 and FIG. 4 that, in addition to forming multiple I/O channels between front devices and back devices of multiple VMs, a host may also form multiple data transmission channels between back devices of the multiple VMs and a native device by adjusting a mapping relationship between queues in back devices of multiple VMs and queues in the native device of the host. This achieves multiple I/O channels between the front devices of the multiple VMs and the native device of the host, and improves a data transmission capability between the front devices of the multiple VMs and the native device of the host.

As regards to the method for adjusting an I/O channel on a virtual platform, the following embodiment of the present invention provides a structure of an apparatus for adjusting an I/O channel on a virtual platform.

Figure 5:
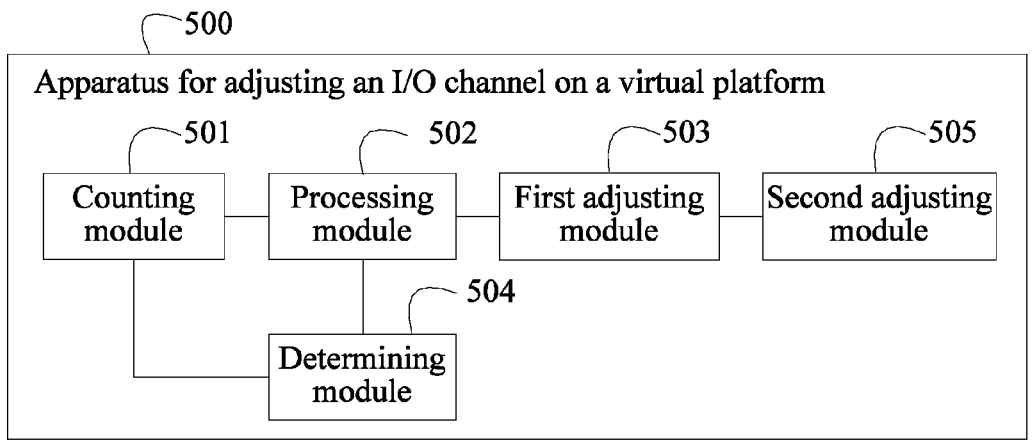
FIG. 5 is a schematic structural diagram of an apparatus for adjusting an I/O channel on a virtual platform according to an embodiment of the present invention.

FIG. 5 describes the structure of an apparatus 500 for adjusting an I/O channel on a virtual platform according to an embodiment of the present invention; and the adjusting apparatus 500 specifically includes: a counting module 501 configured to count current average I/O throughput of multiple VMs operating on the host; a processing module 502, which is connected to the counting module 501 configured to increase working threads for processing VMs between front devices and back devices of the multiple VMs when the current average I/O throughput counted by the counting module 501 is greater than a first threshold value, so that the average I/O throughput of the multiple VMs is less than the first threshold value after the working threads are increased; or decrease working threads between front devices and back devices of the multiple VMs when the current average I/O throughput counted by the counting module 501 is less than a second threshold value, so that the average I/O throughput of the multiple VMs is greater than the second threshold value after the working threads are decreased, where the first threshold value is greater than the second threshold value; and a first adjusting module 503, which is connected to the processing module 502 configured to separately adjust, according to working threads for processing VMs after the increase or decrease by the processing module 502, a mapping relationship between queues in front devices of the multiple VMs and working threads for processing VMs, and a mapping relationship between queues in back devices of the multiple VMs and working threads for processing VMs, so that multiple data transmission channels are formed between the front devices and the back devices of the multiple VMs.

Optionally, the adjusting apparatus 500 further includes: a determining module 504 configured to compare an increase in CPU utilization and an increase in I/O throughput resulting from increasing working threads for processing VMs between the front devices and the back devices of the multiple VMs when the current average I/O throughput counted by the counting module 501 is greater than the first threshold value; the processing module 502 is further configured to increase working threads for processing VMs between front devices and back devices of the multiple VMs if the determining module 504 determines the increase in I/O throughput is greater than the increase in CPU utilization, so that the average I/O throughput of the multiple VMs is less than the first threshold after the working threads are increased.

Optionally, the adjusting apparatus 500 further includes: a determining module 504 configured to determine whether a decrease in CPU utilization resulting from decreasing working threads between the front devices and the back devices of the multiple VMs leads to an inability to respond to the throughput of the multiple VMs when the current average I/O throughput counted by the counting module 501 is less than a second threshold value; the processing module 502 is further configured to decrease working threads between the front devices and the back devices of the multiple VMs if the determining module 504 determines that the decrease in CPU utilization resulting from decreasing working threads between the front devices and the back devices of the multiple VMs does not lead to an inability to respond to the throughput of the multiple VMs, so that the average I/O throughput of the multiple VMs is greater than the second threshold value after the working threads are decreased.

Furthermore, the first adjusting module 503 is specifically configured to: map each working thread to a queue in a front device of each VM and a queue in a back device of each VM when the number of working threads for processing VMs after the increase or decrease is less than the number of VMs operating on the host, or map an exclusive working thread to a queue in a front device and a queue in a back device of a VM, map a shared working thread to queues, which are in front devices and back devices of at least two VMs and do not correspond to the exclusive working thread when the number of working threads for processing VMs after the increase or decrease is greater than or equal to the number of VMs operating on the host, where the working threads for processing VMs include the exclusive working thread and the shared working thread.

Furthermore, the adjusting device 500 further includes a second adjusting module 505 configured to adjust a mapping relationship between queues in the back devices of the multiple VMs and queues in a native device of the host, so that multiple data transmission channels are formed between the back devices of the multiple VMs and the Native Device.

As the second adjusting module 505 forms multiple data transmission channels between back devices of multiple VMs and a native device, multiple I/O channels are formed between front devices of the multiple VMs and the native device of the host, and a data transmission capability is improved between the multiple VMs and the native device of the host.

It is known from the foregoing embodiment that the apparatus for adjusting an I/O channel on a virtual platform determines whether to increase or decrease working threads for processing VMs between front devices and back devices of multiple VMs according to current average I/O throughput of the multiple VMs; when the current average I/O throughput of multiple VMs is greater than a first threshold value, increases working threads for processing VMs, that is, increases I/O channel resources, to improve a data transmission capability of an I/O channel; and when the current average I/O throughput of multiple VMs is less than a second threshold value, decreases working threads for processing VMs, that is, decreases I/O channel resources, to avoid a waste of the I/O channel resources.

Figure 6:
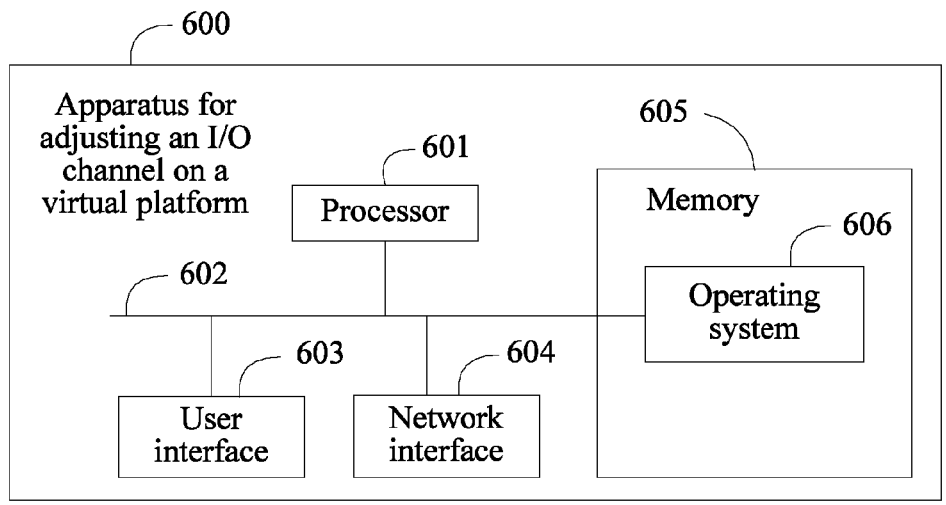
FIG. 6 is a schematic structural diagram of an apparatus for adjusting an I/O channel on a virtual platform according to another embodiment of the present invention.

FIG. 6 describes a structure of an apparatus 600 for adjusting an I/O channel on a virtual platform according to another embodiment of the present invention, and the adjusting apparatus 600 includes: at least one processor 601, for example a CPU, at least one network interface 604 or another user interface 603, a memory 605, and at least a communications bus 602. The communications bus 602 is configured to implement connection and communication between these components. The user interface 603 optionally included in the adjusting apparatus 600 includes a display, a keyboard or a click device (for example, a mouse, a trackball, a touch panel, or a touch display screen). The memory 605 may include a high-speed random access memory (RAM) memory, and may also include a non-volatile memory, for example at least one magnetic disk memory. The memory 605 may optionally include at least one memory apparatus far away from the processor 601. In some implementation manners, the memory 605 may further include an operating system 606, and a plurality of programs so as to implement various basic services and process tasks based on hardware.

The processor 601 is specifically configured to: count current average I/O throughput of multiple VMs operating on the host; increase working threads for processing VMs between front devices and back devices of the multiple VMs when the current average I/O throughput is greater than a first threshold value, so that the average I/O throughput of the multiple VMs is less than the first threshold value after the working threads are increased; or decrease working threads between front devices and back devices of the multiple VMs when the current average I/O throughput is less than a second threshold value, so that the average I/O throughput of the multiple VMs is greater than the second threshold value after the working threads are decreased, where the first threshold value is greater than the second threshold value; and separately adjust, according to working threads for processing VMs after the increase or decrease, a mapping relationship between queues in front devices of the multiple VMs and working threads for processing VMs, and a mapping relationship between queues in back devices of the multiple VMs and working threads for processing VMs, so that multiple data transmission channels are formed between the front devices and the back devices of the multiple VMs.

Furthermore, if the current average I/O throughput is greater than the first threshold value, before executing the step of increasing working threads for processing VMs between front devices and back devices of the multiple VMs, the processor 601 is further configured to: compare an increase in CPU utilization and an increase in I/O throughput resulting from increasing working threads for processing VMs between the front devices and the back devices of the multiple VMs; and if the increase in I/O throughput is greater than the increase in CPU utilization, execute the step of increasing working threads for processing VMs between front devices and back devices of the multiple VMs.

If the current average I/O throughput is less than the second threshold value, before executing the step of decreasing working threads between front devices and back devices of the multiple VMs, the processor 601 is further configured to: determine whether a decrease in CPU utilization resulting from decreasing working threads between the front devices and the back devices of the multiple VMs leads to an inability to respond to the throughput of the multiple VMs; if the decrease in CPU utilization resulting from decreasing working threads between the front devices and the back devices of the multiple VMs does not lead to an inability to respond to the throughput of the multiple VMs, execute the step of decreasing working threads between front devices and back devices of the multiple VMs.

Furthermore, that the processor 601 is configured to separately adjusts according to working threads for processing VMs after the increase or decrease, a mapping relationship between queues in the front devices and the back devices of the multiple VMs and working threads for processing VMs includes: when the number of working threads for processing VMs after the increase or decrease is less than the number of VMs operating on the host, mapping each working thread to a queue in a front device of each VM and a queue in a back device of each VM, or when the number of working threads for processing VMs after the increase or decrease is greater than or equal to the number of VMs operating on the host, mapping an exclusive working thread to a queue in a front device and a queue in a back device of a VM, and mapping a shared working thread to queues, which are in front devices and back devices of at least two VMs and do not correspond to the exclusive working thread, where the working threads for processing VMs include the exclusive working thread and the shared working thread.

Furthermore, the processor 601 is further configured to adjust a mapping relationship between queues in the back devices of the multiple VMs and queues in a native device of the host, so that multiple data transmission channels are formed between the back devices of the multiple VMs and the Native Device.

It is known from the foregoing embodiment that the apparatus for adjusting an I/O channel on a virtual platform determines whether to increase or decrease working threads for processing VMs between front devices and back devices of multiple VMs according to current average I/O throughput of the multiple VMs; when the current average I/O throughput of the multiple VMs is greater than a first threshold value, increases working threads for processing VMs, that is, increases I/O channel resources, to improve a data transmission capability of an I/O channel; and when the current average I/O throughput of the multiple VMs is less than a second threshold value, decreases working threads for processing VMs, that is, decreases I/O channel resources, to avoid a waste of the I/O channel resources.

It should be noted that the method disclosed by embodiments of the present invention may be applied to the processor 601, or in other words, may be implemented by the processor 601. The processor 601 may be an integrated circuit chip, and has an instruction and data execution capability, and a signal processing capability. In an implementation process, steps in the methods may be implemented by using a hardware integrated logic circuit in the processor 601, or an instruction in the form of software. The processor may be a CPU, a digital signal processor (DSP), an application-specific integrated circuit (ASIC), a field programmable gate array (FPGA), another programmable logic component, a discrete gate or a transistor logic device and a discrete hardware component, and may implement or execute all methods, steps, and logical block diagram disclosed by the embodiments of the present invention. The general purpose processor may be a microprocessor, or any conventional processor or the like. The steps in the method disclosed by the embodiments of the present invention may be directly implemented by a hardware processor, or may be implemented by combining hardware and software modules in a processor. The software module may be located in a mature storage medium in the field, such as a RAM, a flash memory, a read only memory, a programmable read only memory, an electrically erasable programmable memory, and a register. The storage medium is located in the processor 601, and the processor 601 reads information in memory 605, and implements the foregoing steps with reference to hardware of the processor 601.

Figure 7:
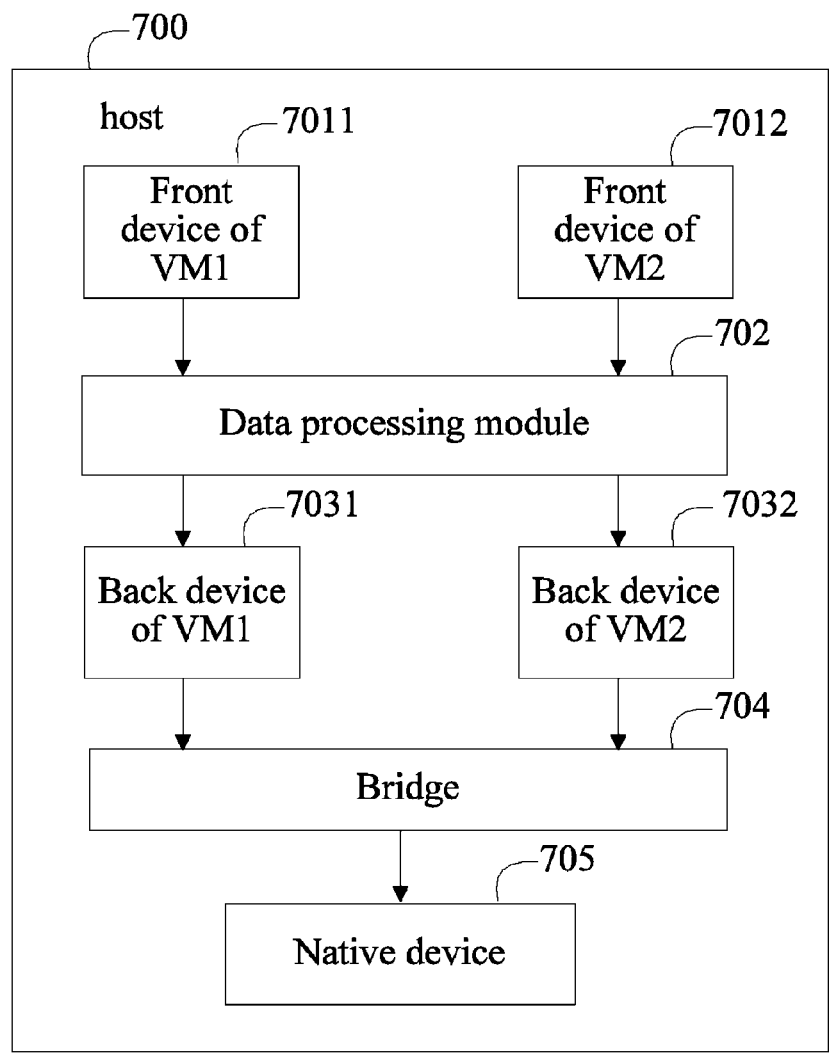
FIG. 7 is a schematic structural diagram of a host according to an embodiment of the present invention.

FIG. 7 describes a structure of a host 700 provided according to an embodiment of the present invention, and the host 700 includes: a native device 705, front devices and back devices in multiple VMs operating in the Native Device 705, a data processing module 702 that is located between the front devices and the back devices of the multiple VMs, and a bridge 704 that is located between the back devices of the multiple VMs and the Native Device 705.

The front devices of the multiple VMs include a front device 7011 of VM1 and a front device 7012 of VM2; the back devices of the multiple VMs include a back device 7031 of VM1 and a back device 7032 of VM2; the bridge 704 is a network device or software located between a back device of a VM and a native device of the host, implements network connection between the back device of the VM and the native device of the host, and forwards a data frame; the native device 705 is a hardware platform on which a virtual environment is operating, and may include a plurality of hardware, for example, a Native Device of a computing node may include a processor (for example, a CPU) and a memory, and may further include a high-speed/low-speed I/O device, such as a network adapter, a memory.

The data processing module 702 is configured to: count current average I/O throughput of the multiple VMs; increase working threads for processing VMs between the front devices and the back devices of the multiple VMs when the current average I/O throughput is greater than a first threshold value, so that the average I/O throughput of the multiple VMs is greater than the first threshold value after the working threads are increased; or decrease working threads between the front devices and the back devices of the multiple VMs when the current average I/O throughput is less than a second threshold value, so that the average I/O throughput of the multiple VMs is greater than the second threshold value after the working threads are decreased, where the first threshold value is greater than the second threshold value; and separately adjust, according to working threads for processing VMs after the increase or decrease, a mapping relationship between queues in front devices of the multiple VMs and working threads for processing VMs, and a mapping relationship between queues in back devices of the multiple VMs and working threads for processing VMs, so that multiple data transmission channels are formed between the front devices and the back devices of the multiple VMs.

Optionally, the data processing module 702 is further configured to: compare an increase in CPU utilization and an increase in I/O throughput resulting from increasing working threads for processing VMs between the front devices and the back devices of the multiple VMs; and if the increase in I/O throughput is greater than the increase in CPU utilization, increase working threads for processing VMs between the front devices and the back devices of the multiple VMs, so that the average I/O throughput of the multiple VMs is less than the first threshold value after the working threads are increased.

Optionally, the data processing module 702 is further configured to: determine whether a decrease in CPU utilization resulting from decreasing working threads between the front devices and the back devices of the multiple VMs leads to an inability to respond to the throughput of the multiple VMs; decrease working threads between the front devices and the back devices of the multiple VMs if the decrease in CPU utilization resulting from decreasing working threads between the front devices and the back devices of the multiple VMs does not lead to an inability to respond to the throughput of the multiple VMs, so that the average I/O throughput of the multiple VMs is greater than the second threshold value after the working threads are increased.

It should be noted that the data processing module 702 may implement the method disclosed in Embodiment 1, which is not described again herein, and should not be interpreted as a limitation on the method disclosed in Embodiment 1; the data processing module 702 is generally implemented by software, that is, it is implemented by reading, by a processor, a software code instruction with a special function. That the data processing module 702 is implemented by software is only a preferred implementation solution, persons skilled in the field may also implement the software method of the data processing unit 702 with a hardware logic, such as a processor (for example, a CPU, a DSP), which is not limited by the present invention.

It is known from the foregoing embodiment that a host determines whether to increase or decrease working threads for processing VMs between front devices and back devices of multiple VMs according to current average I/O throughput of the multiple VMs; when current average I/O throughput of multiple VMs is greater than a first threshold value, increases working threads for processing VMs, that is, increases I/O channel resources, to improve a data transmission capability of an I/O channel; and when current average I/O throughput of multiple VMs is less than a second threshold value decreases working threads for processing VMs, that is, decreases I/O channel resources, to avoid waste of the I/O channel resources.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A method for adjusting an input/output (I/O) channel on a virtual platform, comprising:
    counting, by a host, a current average I/O throughput of a plurality of virtual machines (VMs) operating on the host;
    increasing, by the host, working threads for processing VMs between a plurality of front devices and a plurality of back devices of the VMs when the current average I/O throughput is greater than a first threshold value, wherein the current average I/O throughput of the VMs is less than the first threshold value after the working threads are increased;

decreasing, by the host, working threads for processing the VMs between the front devices and back devices of the VMs when the current average I/O throughput is less than a second threshold value, wherein the current average I/O throughput of the VMs is greater than the second threshold value after the working threads are decreased, wherein the first threshold value is greater than the second threshold value; and separately adjusting, by the host, according to working threads for processing the VMs after the increase or decrease, a mapping relationship between queues in the front devices of the VMs and working threads for processing the VMs, and a mapping relationship between queues in the back devices of the VMs and working threads for processing the VMs, wherein a plurality of data transmission channels are formed between the front devices and the back devices of the VMs.

2. The method according to claim 1, wherein when the current average I/O throughput is greater than the first threshold value and before the increasing, by the host, a working thread for processing the VMs between the front devices and the back devices of the VMs, the method further comprises:

comparing, by the host, an increase in a central processing unit (CPU) utilization and an increase in an I/O throughput resulting from increasing working threads for processing the VMs between the front devices and the back devices of the VMs; and executing the step of increasing, by the host, working threads for processing the VMs between the front devices and the back devices of the VMs when the increase in the I/O throughput is greater than the increase in CPU utilization.

3. The method according to claim 1, wherein when the current average I/O throughput is less than the second threshold value and before the decreasing, by the host, working threads for processing the VMs between the front devices and the back devices of the VMs, the method further comprises:

determining, by the host, whether a decrease in a central processing unit (CPU) utilization resulting from decreasing working threads between the front devices and the back devices of the VMs leads to an inability to respond to the throughput of the VMs; and executing the step of decreasing working threads between the front devices and the back devices of the VMs when the decrease in the CPU utilization resulting from decreasing working threads between the front devices and the back devices of the VMs does not lead to an inability to respond to the throughput of the VMs.

4. The method according to claim 1, wherein the separately adjusting, by the host, according to working threads for processing the VMs after the increase or decrease, a mapping relationship between queues in the front devices of the VMs and the working threads for processing the VMs, and between queues in the back devices of the VMs and the working threads for processing the VMs comprises:

mapping, by the host, each working thread to a queue in the front device of each VM and the queue in a back device of each VM when the number of working threads for processing VMs after the increase or decrease is less than a number of VMs operating on the host; and mapping, by the host, an exclusive working thread to the queue in the front device and the queue in the back device of the VM, and mapping a shared working thread to queues, which are in the front devices and the back devices of at least two VMs and do not correspond to the exclusive working thread when the number of working threads for processing the VMs after the increase or decrease is greater than or equal to the number of VMs operating on the host, and wherein the working threads for processing VMs comprise the exclusive working thread and the shared working thread.

5. The method according to claim 1, wherein after the separately adjusting, by the host, according to working threads for processing the VMs after the increase or decrease, the mapping relationship between queues in the front devices of the VMs and the working threads for processing the VMs, and a mapping relationship between queues in the back devices of the VMs and working threads for processing the VMs, the method further comprises adjusting, by the host, a mapping relationship between queues in the back devices of the VMs and queues in a native device of the host, wherein a plurality of data transmission channels are formed between the back devices of the VMs and the Native Device.

6. A host, comprising:
a native device;
a plurality of front devices and a plurality of back devices in a plurality of virtual machines (VMs) operating on the Native Device;
a data processing module between the front devices and the back devices of the multiple VMs;
a bridge between the back devices of the multiple VMs and the Native Device;
a memory;
a processor coupled to the memory, wherein the memory includes instructions that when executed by the processor cause the data processing module to perform the following:
count a current average I/O throughput of the VMs;
increase working threads for processing the VMs between the front devices and the back devices of the VMs when the current average I/O throughput is greater than a first threshold value, wherein the current average I/O throughput of the VMs is less than the first threshold value after the working threads are increased;
decrease working threads for processing the VMs between the front devices and the back devices of the VMs when the current average I/O throughput is less than a second threshold value, wherein the current average I/O throughput of the multiple VMs is greater than the second threshold value after the working threads are decreased, wherein the first threshold value is greater than the second threshold value; and
separately adjust a mapping relationship between queues in the front devices of the multiple VMs and working threads for processing the VMs, and a mapping relationship between the queues in the back devices of the multiple VMs and working threads for processing the VMs according to working threads for processing the VMs after the increase or decrease, wherein a plurality of data transmission channels are formed between the front devices and the back devices of the VMs.

7. The host according to claim 6, wherein the instructions, when executed by the processor, further cause the data processing module to:

compare an increase in a central processing unit (CPU) utilization and an increase in an I/O throughput resulting from increasing working threads for processing the VMs between the front devices and the back devices of the VMs; and increase working threads for processing the VMs between the front devices and the back devices of the multiple VMs when the determining module determines the increase in the I/O throughput is greater than the increase in the CPU utilization, wherein the current average I/O throughput of the VMs is less than the first threshold after the working threads are increased.

8. The host according to claim 6, wherein the instructions, when executed by the processor, further cause the data processing module to:
determine whether a decrease in a central processing unit (CPU) utilization resulting from decreasing working threads between the front devices and the back devices of the VMs leads to an inability to respond to the throughput of the VMs; and
decrease working threads between the front devices and the back devices of the multiple VMs if the decrease in CPU utilization resulting from decreasing working threads between the front devices and the back devices of the multiple VMs does not lead to an inability to respond to the throughput of the VMs, wherein the current average I/O throughput of the multiple VMs is greater than the second threshold value after the working threads are decreased.

9. A computer comprising:
a memory storing computer-executable instructions;
a processor configured to execute the computer-executable instructions to cause the computer to perform the following:
instantiate a plurality of virtual machines (VMs) on the computer;
count a current average I/O throughput of the VMs;
increase working threads for processing the VMs between a plurality of front devices and a plurality of back devices of the VMs when the current average I/O throughput is greater than a first threshold value, wherein the current average I/O throughput of the VMs is less than the first threshold value after the working threads are increased,
decrease working threads for processing the VMs between the front devices and back devices of the VMs when the current average I/O throughput is less than a second threshold value, wherein the current average I/O throughput of the VMs is greater than the second threshold value after the working threads are decreased, wherein the first threshold value is greater than the second threshold value; and
separately adjust, according to working threads for processing the VMs after the increase or decrease, a mapping relationship between queues in the front devices of the VMs and working threads for processing the VMs, and a mapping relationship between queues in the back devices of the VMs and working threads for processing the VMs, wherein a plurality of data transmission channels are formed between the front devices and the back devices of the VMs.

10. The computer according to claim 9, wherein the processor is configured to execute the computer-executable instructions to further cause the apparatus to:
compare an increase in a central processing unit (CPU) utilization and an increase in an I/O throughput resulting from increasing working threads for processing the VMs between the front devices and the back devices of the VMs; and
increase working threads for processing the VMs between the front devices and the back devices of the VMs when the increase in the I/O throughput is greater than the increase in CPU utilization.

11. The computer according to claim 9, wherein the processor is configured to execute the computer-executable instructions to further cause the apparatus to:
determine whether a decrease in a CPU utilization resulting from decreasing working threads between the front devices and the back devices of the VMs leads to an inability to respond to the throughput of the VMs; and
decrease working threads between the front devices and the back devices of the VMs when the decrease in the CPU utilization resulting from decreasing working threads between the front devices and the back devices of the VMs does not lead to an inability to respond to the throughput of the VMs.

12. The computer according to claim 9, wherein the processor is configured to execute the computer-executable instructions to further cause the apparatus to adjust a mapping relationship between queues in the back devices of the VMs and queues in a native device of the host, wherein a plurality of data transmission channels are formed between the back devices of the VMs and the Native Device.

13. The computer according to claim 9, wherein the processor is configured to execute the computer-executable instructions to further cause the computer to:
map each working thread to a queue in the front device of each of the VMs and a queue in the back device of each of the VMs when the number of working threads for processing the VMs after the increase or decrease is less than a number of VMs operating on the host;
map an exclusive working thread to the queue in the front device and the queue in the back device of the VM; and
map a shared working thread to the queues, which are in the front devices and the back devices of at least two VMs and do not correspond to the exclusive working thread when the number of working threads for processing the VMs after the increase or decrease is greater than or equal to the number of VMs operating on the host, and wherein the working threads for processing the VMs comprise the exclusive working thread and the shared working thread.

* * * * *